United States Patent
Woodward et al.

(10) Patent No.: US 8,655,720 B2
(45) Date of Patent: Feb. 18, 2014

(54) SYSTEMS FOR PROVIDING RETURNS ON REBATED ITEMS AT A POINT-OF-SALE

(75) Inventors: Gregory Charles Woodward, Chatham, PA (US); Harold Irving Woodward, Chatham, PA (US)

(73) Assignee: Empire Technologies, Inc., Chatham, PA (US)

( * ) Notice: Subject to any disclaimer, the term of this patent is extended or adjusted under 35 U.S.C. 154(b) by 259 days.

(21) Appl. No.: 12/301,947

(22) PCT Filed: May 22, 2007

(86) PCT No.: PCT/US2007/012218
§ 371 (c)(1),
(2), (4) Date: Aug. 5, 2010

(87) PCT Pub. No.: WO2007/139801
PCT Pub. Date: Dec. 6, 2007

(65) Prior Publication Data
US 2010/0299197 A1  Nov. 25, 2010

Related U.S. Application Data

(60) Provisional application No. 60/802,364, filed on May 22, 2006, provisional application No. 60/847,187, filed on Sep. 26, 2006.

(51) Int. Cl.
*G06Q 30/00* (2012.01)
(52) U.S. Cl.
USPC ....................................................... 705/14.23

(58) Field of Classification Search
USPC ....................................................... 705/14.23
See application file for complete search history.

(56) References Cited

U.S. PATENT DOCUMENTS

| | | | |
|---|---|---|---|
| 5,710,886 A | 1/1998 | Christensen et al. | |
| 5,729,693 A | 3/1998 | Holda-Fleck | |
| 5,905,246 A | 5/1999 | Fajkowski | |
| 6,039,244 A | 3/2000 | Finsterwald | |
| 6,278,980 B1 | 8/2001 | Wendkos | |
| 6,450,407 B1 | 9/2002 | Freeman et al. | |
| 6,467,686 B1 | 10/2002 | Guthrie et al. | |
| 6,847,935 B1* | 1/2005 | Solomon et al. | 705/14.23 |
| 2002/0161641 A1 | 10/2002 | Quinlan et al. | |
| 2004/0210481 A1 | 10/2004 | Quinlan et al. | |

FOREIGN PATENT DOCUMENTS

| | | | |
|---|---|---|---|
| WO | 2007139801 A2 | 12/2007 | |
| WO | 2007139801 A3 | 12/2007 | |

* cited by examiner

*Primary Examiner* — Saba Dagnew

(57) ABSTRACT

A system for providing instant rebates to a customer at a point of sale includes a kiosk by which the customer initiates a rebate process by presenting a machine readable document having rebate information generated by a retailer's POS system. The customer may initiate an electronic funds transfer to the customer's account for amount of the rebate due, or alternately receive a printed check or a store card with a credit balance redeemable at the point of sale. The kiosk may report rebates in real time and have additional functionality to assist manufacturers and retailers for other marketing purposes.

25 Claims, 6 Drawing Sheets

102

12.1" 1600x1200 Flat-panel Touch Screen Display 1.1GHZ CPU Processor 256MB Mem, 40GB Disk Storage Windows XP/2000 Operating System (MICR) Check Printer Flat/Embossed Card Dispenser 2000 count Omni-Directional Barcode reader Dimensions (DxWxH): 13"x 13" x 51" Weight 150LBS

SYSTEMS FOR PROVIDING RETURNS ON REBATED ITEMS AT A POINT-OF-SALE

CROSS-REFERENCE TO RELATED APPLICATIONS

This application claims priority under 35 U.S.C. §119 to PCT Patent Application Ser. No. PCT/US2007/012218, having an international filing date of May 22, 2007, which in turn claims priority under 35 U.S.C. §119(e) to U.S. Provisional Patent Application Ser. No, 60/802,364 filed in the name of Gregory Charles Woodward et al. on May 22, 2006, and further claims priority under 35 U.S.C. §119(e) to U.S. Provisional Patent Application Ser. No. 60/847,187 filed in the name of Gregory Charles Woodward et al. on Sep. 26, 2006, the entirety of each being incorporated herein by reference.

BACKGROUND

For several years, manufacturers and retailers, particularly in the technology industry, increasingly have offered rebated items. Manufacturers appreciate the opportunity the rebate practice offers to promote their products, and retailers benefit because rebates draw people into their stores. However, these benefits are somewhat mitigated by the fact that consumers often experience the rebate process as both frustrating and time-consuming. This frustration is often directed towards the retailer as the responsible party when, in fact, the manufacturer is usually the issuer of the rebate. Retailers are increasingly subjected to bad public relations because of this misconception.

PLUSNET MARKETING (PNM) is a Wilmington, Del. based fulfillment house and consultant on business services to pharmacy chains, grocers and similar retailers. PLUSNET MARKETING is a leader in advanced fulfillment systems and had operated an earlier conventional "mail in" rebate redemption system based on conventional inputs of UPC, proof of purchase and consumer information. As an improvement over such conventional mail-in programs, PNM has developed and implemented a patented system which allows a consumer to redeem his rebate in as little as two weeks, all without sending in a receipt or barcode. Currently PNM has its technology in COMPUSA, RITE AID, HAPPY HARRY'S DRUG STORE and some other retailers. PNM launched its improved rebate program in COMPUSA on Sep. 25, 2005, and has since saturated the entire chain of 250 stores. STAPLES, and its fulfillment company PARAGO, are also currently operating a similar system.

The fulfillment system now used by PNM, according to its U.S. Patent Publication No. 2004/0210481 (the entirety of which is herein incorporated by reference), may generally be described by the following process steps:

(1) a consumer purchases a product and receives receipt with a corresponding serial number;
(2) the consumer accesses a designated site of a global computer information network. Such as the Internet;
(3) the consumer enters and transmits (i) a serial number of the product and (ii) the consumer's personal information;
(4) a rebate fulfillment administrator receives electronic data transfer of purchase data records from point-of-sale (POS) system;
(5) the fulfillment administrator (i) associates each stored data record with a purchase data record, (ii) validates the rebate claim, and (iii) confirms that the claim is not fraudulent; and
(6) the fulfillment administrator transfers the cash value of the rebate claim to the consumer.

PLUSNET MARKETING systems are further described in its U.S. Pat. No. 6,748,365, U.S. Publication No. 2004/0125514 and U.S. Publication No. 2002/0161641, the entirety of each being incorporated by reference. These disclosures cover improvements on conventional rebate systems, which speed and simplify the redemption process as well as encourage e-filing via the retailer's website, which in turn, provides exposure to promotions and customer directed information. Key features of the PNM's disclosed systems include a transaction code that consumers submit to the fulfillment center which is generated at the POS. The code is used to initiate a rebate claim, rather than uniform product code (UPC) and proof of purchase sales receipts, as with conventional rebate systems. A purchase record is also generated by the retailer's POS, including all items purchased, units, price and product code, date, time and place of purchase together with the unique transaction code. The retailer electronically transfers this data to the fulfillment center.

In PNM's disclosed systems, rebate claims can include a multitude of different rebate eligible items, can be submitted electronically via the Internet (via the retailer's or fulfillment center's web site or the like), by phone or by paper copy. Claims are filed after purchase and redemption sequentially follows claim filing. This facilitates cumulative rebate programs. Claims can be paid by multiple means such as check payment, store credit, loyalty card, and promotions premiums.

Retailers using PNM's system as implemented display an icon on their receipts indicating which rebated items are eligible for electronic submission. Currently their implemented service is limited exclusively to retailer rebates only.

Other proposed improvements to rebate programs have been described in U.S. Pat. Nos. 6,467,686; 6,450,407; 6,278,980; 6,039,244; 5,905,246 and 5,729,693. However, all such proposed and existing systems likewise involve a substantial delay between the time of purchase and the time in which payment can be requested and received by a consumer. Thus, manufacturers, retailers and the consumers would benefit greatly by further improvements to the rebate redemption process.

SUMMARY

Accordingly, a system for providing instant returns on rebated items is now introduced herein. Such a system may be implemented through the use of electronic work stations, such as kiosks or ARMs (Automated Rebate Machines), which are located in retail stores or other locations of a sale, and having dedicated Internet portals using state-of-the-art technology.

The disclosed system may offer an immediate rebate on manufacturer-rebated items or on retailer-rebated items from within a retailer's location. As part of the rebate process, an on-site ARM may be equipped to dispense either (i) a rebate check that is redeemable in the store or at any banking institution, or (ii) a rebate card credit, gift card, or the like that provides bonus points good or a currency value for future store purchases. Alternatively, the customer may initiate an electronic funds transfer (EFT), by which the rebated amount will be credited to a banking or credit card account designated by the customer. Such system offers increased convenience to customers in a variety of manners. Consumers have no forms to fill out, nor do they have to wait to receive the rebate.

In various embodiments, a service fee is collected by the operator of the kiosk from which a rebate is requested and received. The fee may be paid by the customer requesting the refund, or instead may be paid by the retailer or manufacturer. For example, the customer can choose to redeem the rebate by check or EFT, less a service fee to the kiosk operator, or to have points credited to a store card in the full amount of his rebate. Should the store card option be selected, the service fee may be paid by the retailer or manufacturer.

The disclosed rebate system is attractive to retailers, since the kiosk can sell and distribute store gift cards, which will relieve congestion at the POS saving a retailer time and money. Additionally, when a customer selects the store card credit option, the promotion value becomes guaranteed future revenue for the retailer.

Restrictive legislation and regulation in recent years has forced retailers and manufacturers to revamp their rebate programs. There is a need to efficiently manage a supplier rebate and retail promotion program that enhances buyer's satisfaction with the retail experience, and hence revenues, at minimal cost to the merchant. The disclosed system can further enhance revenues in the merchant's additional channels of distribution through means of sharing data on store buyer preferences and purchase activity, including positive response level to available promotions by promotion type. Thus, the rebate system now introduced provides an advantageous real-time solution that can be readily implemented by a retailer or a manufacturer to address and remedy these concerns and enhance the rebate process for all parties involved.

BRIEF DESCRIPTION OF THE DRAWINGS

Further aspects of the present disclosure will be more readily appreciated upon review of the detailed description of its various embodiments, provided below, when taken in conjunction with the accompanying drawings, of which.

DETAILED DESCRIPTION

Figure 1:
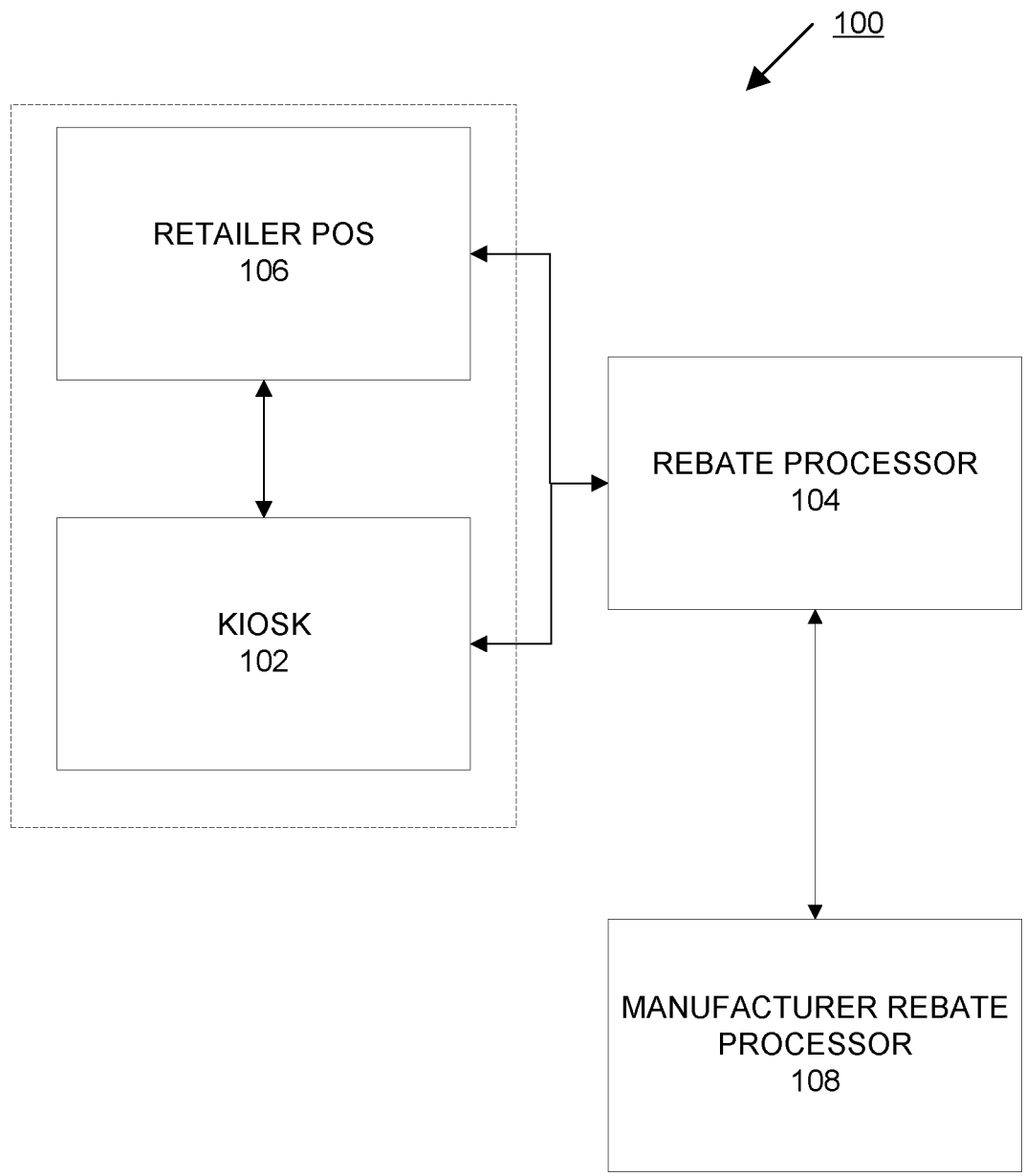
FIG. 1 is an illustration of an exemplary network over which the disclosed rebate processes are performed.

Turning now to FIG. 1, an exemplary rebate system 100 is depicted for accomplishing a rebate redemption transaction with a customer of a retailer. The system 100 may include a kiosk 102 by which a customer may initiate an instant rebate request; a rebate processor 104 maintained by an operator of the kiosk for processing and issuing a payment in response to the rebate request; a retailer's point-of sale system 106, which may include the checkout registers and transaction processing systems for accomplishing sales with a customer and storing transaction related information; and a manufacturer rebate processor 108 by which a manufacturer may provide confirmation of a validity of a rebate request against stored records.

It will be readily appreciated that the components of the system 100 may each be standard computer processors having suitable hardware and software and enabled to communicate over a network, such as a local area network, a wide-area network, an intranet or a public global computer network (e.g., the Internet), in any known manner. It will be further appreciated that any number of components can be used to perform the functions designated for components 102-108 herein, including provision of intermediate network gateways, distributed processors, third-party processing servers, and the like, as may be needed for real-world implementation. Finally, it will be readily apparent that the system of FIG. 1 can be scaled to include any number of retailers, manufacturers and kiosks.

Figure 2:
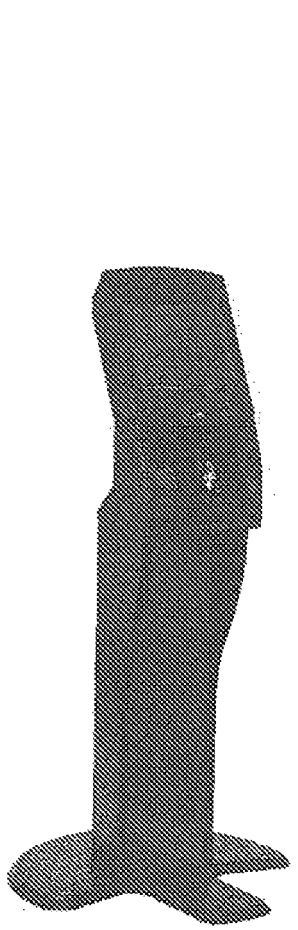
FIG. 2 is an illustration of an exemplary kiosk in communication with the network of FIG. 1, for use at the location of a sale to provide a rebate to a consumer.

In various embodiments, the kiosk 102 may be a unitary stand-alone system having a display (such as a touch screen panel), a computer processor with suitable memory and operating system and application software, a printer, a card reader/dispenser, a barcode scanner, and/or additional standard components, as may be necessary for accomplishing the functions described herein. SOURCE TECHNOLOGIES offers one type of kiosk that is contemplated for use with the rebate system herein. An exemplary kiosk 102 is depicted in FIG. 2. In various embodiments, the kiosk 102 is tailored to intercommunicate with a retailer's POS system 106, either directly or via rebate processor 104, for purposes of real-time data validation disbursements, as well as for fraud protection.

In various embodiments, the kiosk 102 incorporates one or more interfaces that do not require manual data entry by the customer. Data may be read from a machine readable document (MRD) or card issued by a retailer at a POS 106. Any further information may be received from the customer by voice recognition using appropriate software and a microphone, as is well known in the art. Alternatively or in addition thereto, the display may include touch-screen functionality for rapid selection and input of customer requests and information. These features would allow for substantially error-free data entry by a customer participating in a rebate redemption transaction, thereby maintaining certain efficiencies in the management of a rebate transaction system 100.

In further embodiments, a kiosk 102 or other suitable ARM, may be piggybacked with an automatic teller machine (ATM) or the like. This concept can be compared to COINSTAR, which is positioned in the retail space as a customer service that deducts a service fee for its coin counting services on behalf of its own entity separate from the retailer. As part of the rebate process, such an enhanced kiosk could be equipped to provide cash, electronic funds transfer, a rebate check that is redeemable in the store or at a bank, or a store card or gift card having a credit balance in the form of bonus points that are redeemable for future store purchases. These options all offer additional convenience to customers. Several kiosks might be in each store, and the check printer may be placed at a central location in a retail location, such as a customer service counter, so that customers may take a receipt from the kiosk to the customer service counter and redeem the check at that point.

The rebate processor 104 may be maintained and operated by a retailer a manufacturer, a group of manufacturers and/or retailers or maintained by one or more third parties. The rebate processor 104 may manage a secure database of participating rebated items, and maintain a real-time log and records journal entries for every transaction. The rebate processor 104 may provide retailers and manufacturers with access to real-time feeds of redemption data, in which a validation process electronically compares purchase data transferred from the customers' MRDs, or the like, with its own real-time log of current promotions. This process allows the operator of the rebate processor 104 to search from its database the amount (if any) of rebates due to customers entering rebate requests. The amount(s) may appear on the display of the kiosk 102, and the customer can then choose to redeem his rebate from the kiosk 102 in any of the variety of manners already described.

The rebate processor 104 may intercommunicate rebate transaction data between a kiosk 102 and the retailer's point-of-sale (POS) system 106, and, if available to the system 100, a manufacturer's rebate processor 108, for purposes of transaction validity confirmation and fraud prevention. The manner in which such components are integrated and intercommunicate may be accomplished in any of a wide variety of known manners. It is readily contemplated that the components may operate in a manner similar to that of CYBERFONE TECHNOLOGIES, INC., as described in their U.S. Pat. Nos. 6,973,477; 6,574,314; 6,044,382; 5,987,103; and 5,805,676, the entirety of each being incorporated herein by reference as relates to such functionality.

The rebate confirmation processes employed between such components of the system 100 may be generalized as a comparison between the information received during a customer's rebate request entered into the kiosk 102 with data stored by the rebate processor 104, the retailer's POS system 106 and/or the manufacturer's rebate processor 108. If the data submitted by the customer does not match records stored by one or more of the other components, then the rebate transaction is simply not processed. In this manner, prevention against fraudulent transactions may be readily achieved.

The processes performed by the system 100 using the components as described above during a rebate transaction may be generally described as follows. When a customer purchases a rebated item at a retailer's POS, the amount of the rebate appears on the sales receipt and the rebate is credited to a machine readable document (MRD) which may include a scannable barcode or the like, which is given to the customer, When a customer wishes to collect on the rebate immediately, the customer need only insert or scan the MRD, or information therefrom, in the kiosk 102 located in the store where the purchase was made. The system 100 has stored information on which items are participating rebate items and also maintains a log and records journal entries for every transaction. The system 100 looks up the customer's entered information in its database, and confirms the amount (if any) of any rebates due to the customer. The amount(s) may appear on the kiosk screen, and the customer can then choose to redeem the rebate by cash, check, store or gift card with dedicated store balance, or electronic funds transfer to the customer's credit or banking account. The manufacturer or other issuer of the rebate may electronically advance money to the kiosk operator's financial account, which in turn executes payment to the customer in the requested manner.

The system can offer retailers/manufacturers turn-key access to its cost sharing program which is the sharing of service fees to compensate for increased rebate claims on certain items. For example, if the customer chooses the check option, the kiosk 102 will issue a check to the customer for, as an example, 90% of the rebate value, holding back, for example, a 10% service fee. The service fee may then be allocated, such as 9% to the kiosk operator and 1% to the issuer of the rebate. The kiosk may print and disburse store only checks or, if requested, standard checks in regulatory approved, industry standard checks in standard Magnetic Ink Character Recognition (MICR) formats, readable by bank processing equipment around the world.

In various embodiments, the system may use electronic transfer of funds to process both manufacturer and retailer rebates. In such embodiments, when a customer purchases a rebated item, the customer may enter their desired bank account information either by touch-screen entry or insertion of a card corresponding to the customer's account from which the account information may be read. Services fees may be applied to EFTs in the manner described above.

If the customer instead chooses a store credit option, the customer may be offered 100% of the rebate value, in which case, the retailer may pay the 10% service fee to the kiosk operator and/or manufacturer in similar proportion to the above. The kiosk may dispense a store or gift card having thereon a credit balance in the full amount of the rebate and good for future purchases with the retailer.

One problem faced by instant rebate returns is the possibility that a customer may attempt to return merchandise after a rebate has been paid on such product. In order to address this, the system 100 handles returns in the following general manner. When merchandise is scanned in the event of a return, the rebate processor 104 is notified and searches its real-time log of redemption reports and deducts from the purchase price the rebate funds previously transferred to the end-user via the system. The system electronically transfers back the entire service fee from the item(s) in question and the customer is credited for his return. In the event the system is involved in a cost sharing arrangement with a participating manufacturer/retailer these funds would become a receivable for the kiosk operator, since it will be necessary to advance the entire service fee back to the customer. This could he accomplished via instant electronic transfer or via periodic batch invoice for manufacturers/retailers using the funds from the kiosk operator's account.

The processes performed by the various components of the System 100 will now be described in more particularity with respect to FIGS. 3-6.

Figure 3:
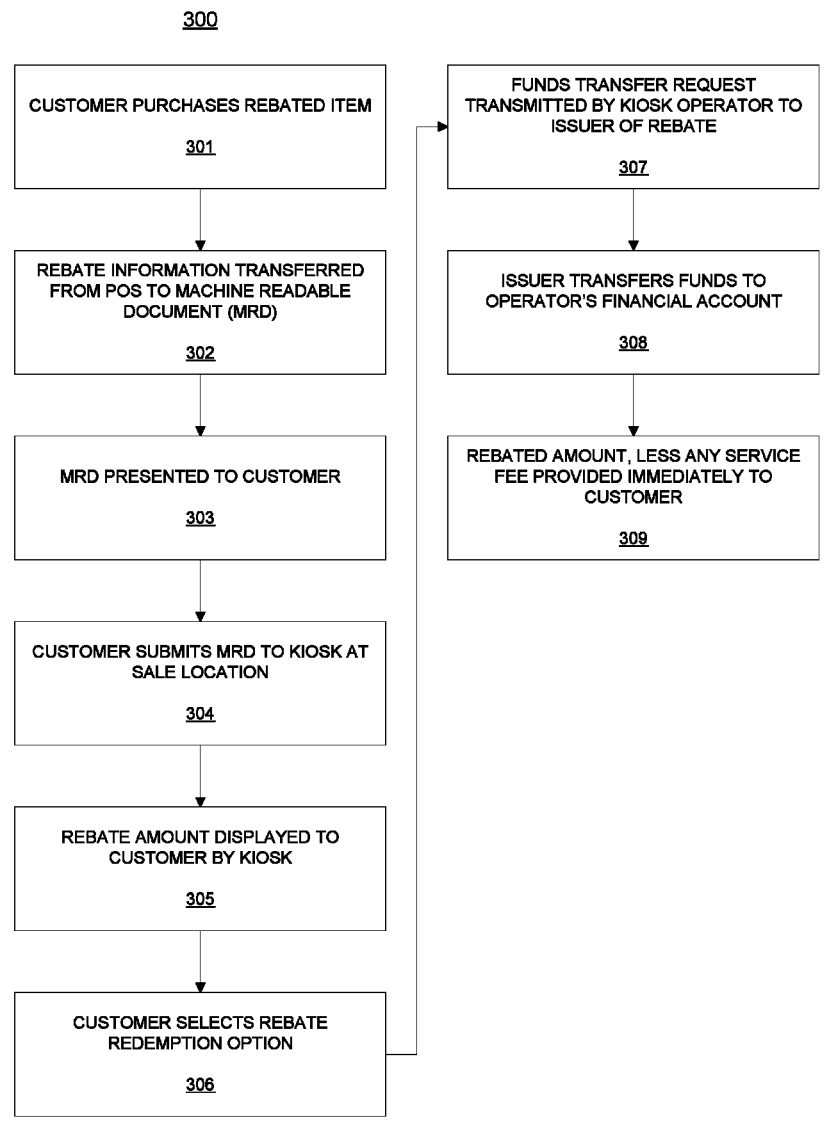
FIG. 3 depicts an exemplary rebate transaction performed using the kiosk of FIG. 2.

Turning now to FIG. 3, therein is depicted an exemplary method 300 for completing a rebate transaction process with manufacturer and/or retailer rebates is illustrated in the following exemplary steps:

A customer buys a rebated item at a retailer's POS 106 (step 301). All relevant information necessary to validate a rebate claim is extracted from the databases connected to the POS system 106 and electronically or manually transferred onto a MRD (step 302). All relevant purchase data including transaction code, stock keeping unit (SKU) number, date/time of purchase, store location and rebate amount may be extracted from the POS system 106 and transferred onto the MRD. The customer receives the MRD with other standard receipts for the sale (step 303). The customer then submits the MRD to the kiosk 102 (step 304). The system 100 verifies the customer's claim by accessing its own database or a database maintained by the retailer and/or manufacturer. Such database includes all current rebate offers, which the kiosk 102 compares with data stored on MRD. The available rebates based on MRD information and confirmed stored records are displayed (step 305). The customer then selects the cash, check, store/gift card or EFT option (step 306). After confirmation, the rebate processor 104 then electronically transmits the funds transfer request to the manufacturer or other issuer of the rebate (step 307). The manufacturer electronically transfers funds to the kiosk operator's financial account (step 308). The kiosk 102 then issues the payment to the customer in the desired manner (step 309).

Figure 4:
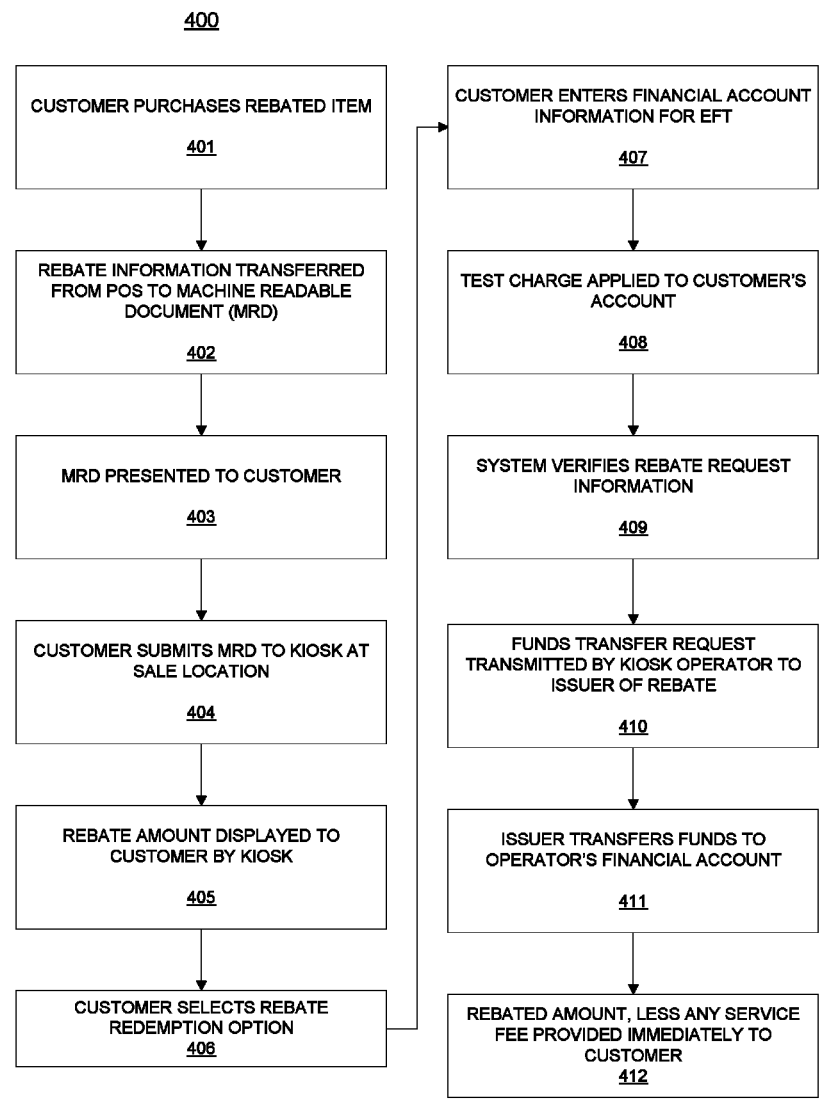
FIG. 4 depicts a second exemplary rebate transaction performed using the kiosk of FIG. 2.

Turning now to FIG. 4, an alternate exemplary method 400 for accomplishing a rebate transaction process involving manufacturer and/or retailer rebates is illustrated in the following steps:

A customer buys a rebated item at a retailer's POS 106 (step 401). All relevant information necessary to validate a rebate claim is extracted from the POS system 106, and transferred onto a MRD (step 402). The customer receives the MRD with other receipts (step 403). The customer enters the MRD information into the kiosk 102 (step 404). The kiosk 102 displays the available rebate to the customer (step 405). The customer then chooses the EFT rebate method (406). The customer enters bank card or credit card information or the card itself into the kiosk 102 (step 407). A customer password may also be entered for the corresponding account. The kiosk 102 then establishes a test charge to the designated account (step 408). In various embodiments, the customer may agree to allow the system 100 to store the card information for the duration of the return period specified by the retailer, which is used as collateral in the event the customer returns the rebated item after collecting a rebate from the system 100.

Next, the rebate processor 104 verifies the claimed rebate by accessing its own database of current rebate offers, and/or information from databases maintained by the retailer and manufacturer, and compares with data received from the customer for verification purposes (step 409). The rebate processor 104 then electronically transmits a funds transfer request to the issuer of the rebate (step 410). The issuer responds by electronically transferring funds to the kiosk operator's financial account (step 411). Finally, the kiosk 102 transfers the appropriate rebated amount to the customer (step 412).

Figure 5:
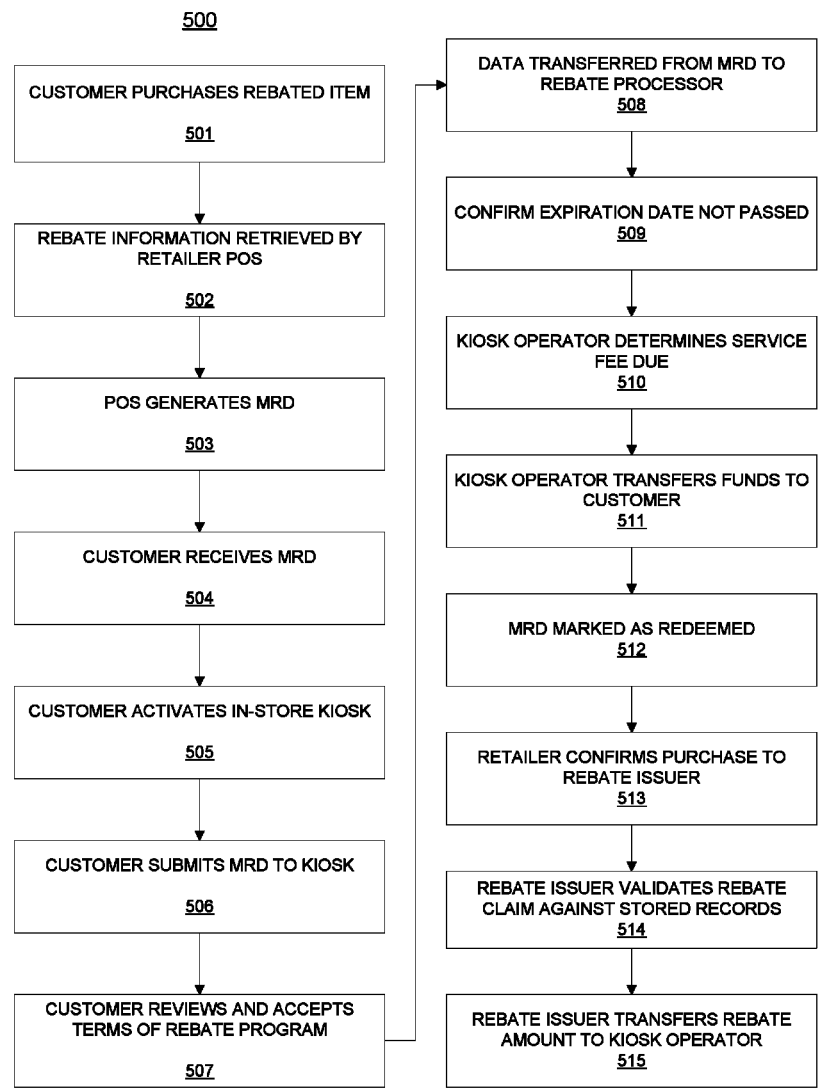
FIG. 5 depicts an exemplary rebate process involving retailer or manufacturers rebates having an expiration date, performed over the system of FIG. 1.

Turning now to FIG. 5, therein is depicted an exemplary rebate process 500 involving retailer or manufacturers rebates having an expiration date, which may include the following steps:

The consumer purchases an e-rebated product at POS 106 (step 501). The POS system 106 extracts relevant POS data including, for example, transaction number, SKU and expiration date on the rebate (step 502). This data is transferred onto a MRD (step 503). The customer receives this MRD along with or attached to the customary sales receipts (step 504). The MRD may either be scanned and provided at POS, much like a gift card, or it can be generated using a printer at the POS. The consumer then activates the site designated for e-redemption of rebates via the kiosk 102 (step 505) and submits the MRD or information therefrom into the kiosk 102 (step 506). The customer then reviews and accepts terms of the kiosk operator, reviews the privacy statements, and agrees to a service fee of x %, when applicable (step 507) The EDT information is collected and electronically transferred from the MRD into the rebate issuer's designated site (step 508). The rebate expiration date is compared to the date of the rebate request (step 509). The kiosk operator extracts funds from a revolving line of credit or the like, in the amount indicated on the rebate coupon less the applicable service fee (step 510). The funds are then transferred to the consumer in the designated manner (step 511). The kiosk 102 marks the MRD or electronically documents it as paid and dispenses it back to the customer (step 512). The consumer will need to present all receipts, including the MRD, in order to return an e-rebated item. The rebate issuer receives an electronic data transfer (EDT) record of the purchase from the POS system (step 513). The rebate issuer associates each stored data record with a purchase data record and validates the rebate claim thereby and checks for fraud (step 514). The rebate issuer then transfers the cash value of the rebate claim to the kiosk operator (step 515).

Figure 6:
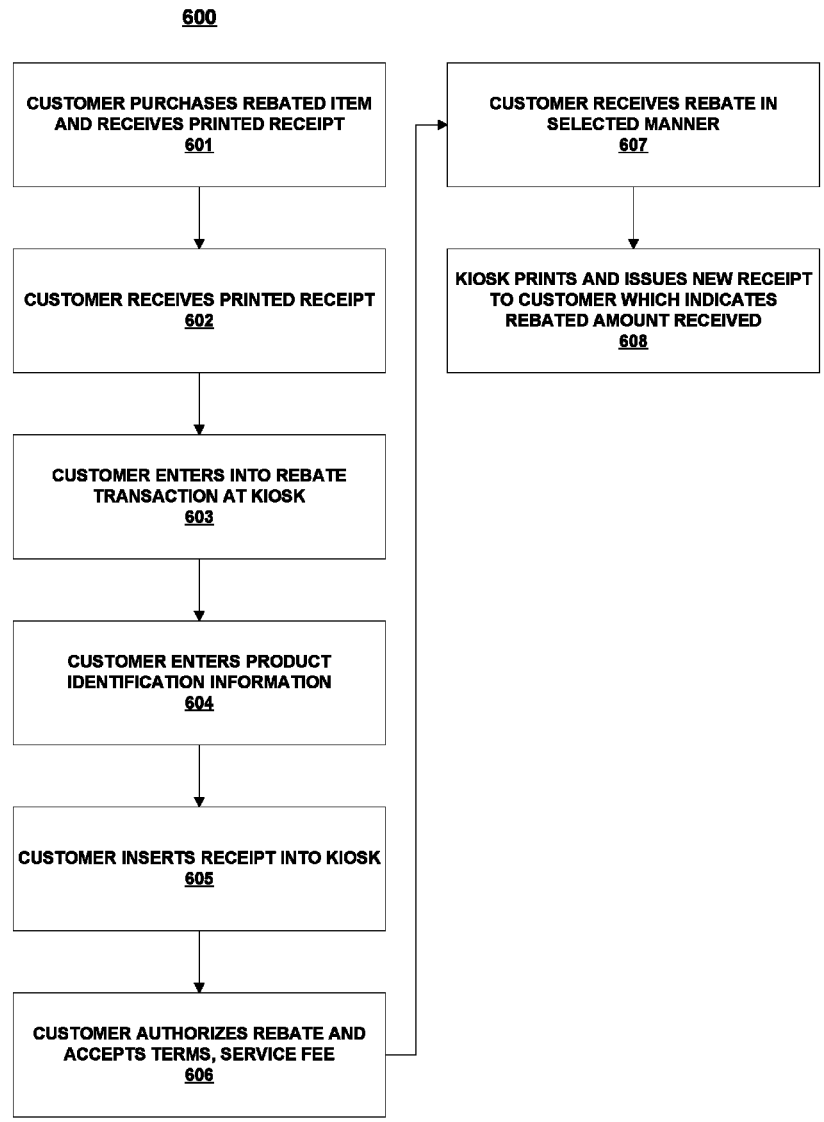
FIG. 6 depicts an exemplary new receipt issuing process performed by the kiosk of FIG. 2.

In additional embodiments, the system 100 may accept a store issued sales receipt and re-issue a new receipt after a rebate has been claimed by the consumer. This method is meant to counter attempts by the customer to redeem the rebate and then return the item to the store for a full refund. Such new receipt issuing process 600 may be described by the following exemplary steps, as illustrated in FIG. 6:

The customer purchases item at point of sale (POS), and receives a receipt that corresponds with the purchase (step 602). The customer enters information related to the rebate being offered, the purchase at hand and the identity of the customer into the kiosk after POS sale (step 604). The customer then enters the product identifier of the product into the kiosk 102 (step 605). The customer then inserts receipt or information therefrom into the kiosk 102 (step 606) which is stored in memory. The customer authorizes the rebate and reviews and accepts the terms and conditions, including service fees if any (step 607). The customer receives the rebate in the designated manner (step 608). A new receipt is printed by the kiosk 102, which includes all the relevant information from the POS transaction minus the rebate amount which was collected by the consumer via the system 100 (step 609). The receipt now shows the remaining cash value of the purchased item.

As a significant portion of their business, many retailers sell merchandise via telephone or online ordering with subsequent delivery to the address of the customer. The system 100 can easily support these programs by simply engaging the retailer to select and assign a controlled group of employees at their merchandise shipment location to operate the kiosk 102 of the system 100. The kiosk operator would provide retailers with commercially accessible kiosks 102 for their employees to operate from a merchandise shipment location. These kiosks 102 integrate with the rebate processor 104 real-time databases and the retailer's transaction processing system, and have the same secure site management, real-time data validation and fraud protection, as described in the foregoing. Before operating the ARM, employee identification is stored by the system 100 and may require a login to the system, via password, biometric fingerprint or ID scanner, or the like, to validate the employee.

Alternatively, or in addition thereto, the system 100 can be adapted to integrate with a retailer's online data system, enabling the operator to gain access to relevant information from the customer's request, which is necessary to complete its rebate transaction. This could be done in a manner which would eliminate the need for an employee to manually enter the customers request into a kiosk 102. This process could also interact with an out sourced mailing operation which would receive electronic requests from the system to send payment to the consumer. This would mean that the consumer receives the method of payment separately from the purchased item, or the method of payment could be produced and sent from a retailer's merchandising shipment location and a check or gift card is sent to the customer along with the rebated item.

The system, as kiosk operator, anticipates offering retailers and manufacturers two methods of money transfer to select from, both of which are feasible from a technical and banking perspective. The first method allows the system to electronically advance funds to the end-user instantly via a revolving fund financed from a partner bank. The fund, with a likely interest rate of prime plus one, would either be secured in full or partially by receivables which in this case are rebates. After advancing funds to the end-user, the system will electronically send periodic batch requests to participating manufacturers/retailers offering rebates. The life cycle of the revolving fund could span two-four weeks. This would allow enough time for the system to send manufacturers and retailers a batch invoice and receive payment to replenish the fund.

The system can also operate with company provided instant electronic transfer components. The system's secure site management, real-time validation and fraud protection are critical elements of the instant electronic transfer process. This knowledge allows the manufacturer's/retailer's system provided data system to electronically advance money to the system distribution account, which executes instant payment to the end-user via the kiosk or online. The system may incur a modest per transaction cost for each electronic transfer to a customer.

In the rebate fulfillment industry the term "breakage" refers to rebates which are never submitted by the consumer and "slippage" refers to un-cashed rebate checks. Recently, slippage has become more of an issue for fulfillment companies, retailers and manufacturers. This is because the amounts of unclaimed monies have dramatically increased as rebates starting in the mid-1990s have become more significant. To date there is no universally accepted process for so many different potential rebate funding scenarios and all States have similar but different escheat laws. The system will issue store gift card credit and corporate checks made payable to cash. Because the system issues blind checks, all escheat would be transferred to the system operator's state of incorporation. The system will maintain records of cashed and un-cashed checks based on check numbers. With the appropriate language during a store gift card credit transaction, the system can maintain an escheat exception, as long as no portion of the card is redeemable for cash.

The following descriptions describe some post-pilot project strategies which extend the capabilities of the system 100 beyond the rebate process. These functionalities include the use of buyer profiles, buyer specific marketing strategies, product look up services as well as the incorporation of Voice over IP technology (VOIP). The system is a system of buyer accessible, user friendly, hardware and software configured kiosks strategically located throughout the merchant's retail space.

These readily accessible user stations could provide the following benefits to the customer, the retailer and the manufacturer. The customer may receive immediate credit for purchases of product offering manufacturer rebates and/or retailer in-store promotional or preferred customer discounts, have user-friendly electronic access to more product information for comparative purposes to aid the purchase selection.

In a retail chain store business of sufficient outlets, a remote helpdesk, organized by product category and staffed by category specialists, could be accessed from the kiosk by the customer employing VoIP two-way communications or the like. This approach can help maintain whatever "sales function" requirements apply to existing staff, currently assisting shoppers on the retail floor. The customer may also have access to further lists of available manufacturer rebate and in-store promotions ideally targeted to the store customer's known product preferences and products associated with those preferences.

For the retailer, the system 100 provides a low-cost competitive differentiator that enhances buyer satisfaction with the supplier's products offered, the retail experience the merchant provides throughout the pre-sale, sale, and post-sale cycle and the likelihood of increasing buyers referrals.

For the manufacturer, the system 100 may result in more favorable buyer response to cumbersome and annoying product rebate promotions now offered There will be a lowered cost of conducting national rebate promotions and receive real-time buyer specific marketing and real-time reports of sales and redemptions via the system 100. Buyer Account Transaction History The system can provide manufacturers and retailers with direct marketing data via automated kiosks or online. This can include buyer specific information based on current or past purchases as well as retailer/manufacturer stored information. Product promotions and advertisements can be uploaded into the system data systems, upon manufacturer/retailer request or by corresponding data system entry and can be tied to specific buyer profiles or product purchases. This information can be directly uploaded into in-store or central data systems.

Kiosks can additionally be programmed to broadcast promotions to consumers during idle periods or during a rebate transaction processing time, product lookup/comparison or during any other consumer initiated transactions. If during a rebate transaction processing, the direct marketing presented to the customer may be related to the customer's present or past purchases, as determined from stored records of the kiosk, the retailer or the manufacturer. The kiosk can additionally print or issue promotional codes to buyers that can be used for specific promotions.

The most expensive part of a rebate from a fulfillment perspective is customer service. Every rebate processed with the system 100 described herein will eliminate the need for customer service for that rebate. Therefore the system 100 would reduce fulfillment expenses by decreasing mailings and the need for customer service. Currently fulfillment companies are paid by their retailer and manufacturer clients on a flat fee basis ranging from $0.40 to $1.75 per rebate. The disclosed system 100 can provide higher revenue possibilities and higher profit margins for a fulfillment component, via the profit sharing relationship.

Various disclosures of the PNM or CYBERFONE systems described previously may be adapted to implement the system 100 now disclosed. Various known means for implementation, other than those particularly described hereinabove, are also contemplated, In additional embodiments, the system 100 and its processes may be present in various markets, including an online presence, by which consumers will instantly credit their bank accounts through a dedicated Internet portal, thereby opening such system to the global marketplace. Other variations, substitutions and alterations to the processes described above are likewise contemplated to be within the scope of the present disclosure.

What is claimed is:

1. A method for processing a rebate submitted at a location of a sale after a purchase of an item subject to the rebate, the method initiated by a computing device operated by a customer and performed over a data network by a programmed rebate processing device, the method comprising:
   receiving, by the programmed rebate processing device via the data network from a point-of-sale system at the location, electronic data corresponding to the purchase of the item subject to the rebate, the point-of-sale system configured to process the purchase for the customer;
   communicating, from the rebate processing device to the point-of-sale system, rebate data;
   subsequently receiving, by the rebate processing device via the data network and from the computing device operated by the customer, a rebate request initiated with machine-readable information and presented to the computing device by the customer, wherein the machine readable information is generated by the point of-sale system and presented to the customer at the location;

processing, by the rebate processing device, the rebate request using the data read by the computing device directly from the machine-readable information from the customer by automatically comparing the data read from the machine-readable information to the electronic data;

and when the information substantially matches:

transmitting, by the rebate processing device via the data network for display on the computing device operated by the customer, a plurality of rebate redemption options;

receiving, by the rebate processing device from the computing device, a selection of at least one of the rebate options; and preparing, by the rebate processing device, a selected rebate option for transmission to the customer in accordance with the selection.

2. The method of claim 1, wherein the rebate redemption options include one or more of:

cash, a printed check, an electronic funds transfer to a financial account of the customer, a credit balance for redemption at a retailer corresponding to the location of the sale, a product offered by the retailer, and a card with a credit balance.

3. The method of claim 1, wherein the computing device comprises a kiosk at the location of the sale.

4. The method of claim 1, further comprising: presenting direct marketing information on a display of the computing device.

5. The method of claim 4, wherein the direct marketing information that is presented to the customer is based on stored information of the customer or the purchased item.

6. The method of claim 3, wherein the machine readable information is provided to the customer at the point-of-sale during the purchase.

7. The method of claim 1, wherein the rebate includes a rebated amount for the item less a service fee.

8. The method of claim 2, wherein the card includes one of a store card with a credit balance and a gift card with a credit balance, for which the customer is not charged a service fee.

9. The method of claim 1, wherein the rebate is paid by a third party, and an issuer of the rebate compensates the third party upon validation of the rebate request.

10. The method of claim 1, further comprising:

providing real-time reporting of the rebate request to at least one of: a retailer corresponding to the location of the sale and a manufacturer of the item.

11. A system for processing a rebate request initiated by a computing device operated by a customer, comprising:

a point-of-sale system configured to process purchase transactions at a location, the point-of-sale system for processing a purchase of an item by a customer and providing to the customer machine readable information having data corresponding to the purchase for initiating a rebate corresponding to the purchase, the point-of-sale system further for transmitting electronic data corresponding to the purchase over a communications network;

a computing device configured to:

receive the machine readable information from the customer, read data directly from the machine readable information, wherein the read data includes data needed from the point-of-sale system for validating the rebate request, initiate a rebate request after the purchase using the data read by the computing device from the machine readable information, the computing device including at least one of: an input device for receiving the machine readable information, a printer for printing a document for redeeming the rebate, a card dispenser for dispensing a card with a credit balance corresponding to the rebate, a communications interface for initiating an electronic funds transfer to an account of the customer, and a communication interface for transmitting the machine readable information over the communications network;

a rebate processor in communication with the point-of-sale system and the computing device over the communications network, the rebate processor configured to:

receive, via the communications network, the electronic data corresponding to the purchase of the item from the point-of-sale system, communicate, via the communications network, rebate data to the point-of-sale system, verify the rebate based on the electronic data received from the point-of-sale system and the data read by the computing device from the machine readable information received from the customer via the computing device, and process the rebate request using the data read directly from the machine readable information by the computing device.

12. The apparatus of claim 11, wherein the computing device comprises a computer of the customer having a network connection to the rebate processor.

13. A method for processing a rebate submitted at a location of a sale after a purchase of an item by a customer at the location, the method comprising:

receiving, by a programmed rebate processing device via a data network from a point-of-sale system at the location, electronic data corresponding to the purchase of the item subject to a rebate, the point-of-sale system configured to process the purchase for the customer;

communicating, from the rebate processing device to the point-of-sale system, rebate data;

receiving, by rebate processing device via the data network and from a computing device operated by the customer, an initiation of a rebate request including data read by the computing device directly from machine readable information generated by the point-of-sale system and having transaction data corresponding to the purchase by the customer, wherein the read data includes data needed from the point-of sale system for validating the rebate request;

processing, by the rebate processing device, the rebate request exclusively in response to receiving the data read by the computing device from the machine-readable information by:

transmitting, by the rebate processing device via the data network to the computing device of the customer at least one rebate redemption option corresponding to the transaction, the at least one rebate redemption option presented to the customer on a display of the computing device;

receiving, by the rebate processing device from the computing device, a selection of at least one of the rebate options; and preparing, by the rebate processing device, the selection for the customer.

14. The method of claim 13, wherein the location of the sale comprises a computer of the customer having a network connection to a computer of a rebate processor.

15. The method of claim 13, wherein the rebate redemption options include one or more of:
cash, a printed check, an electronic funds transfer to a financial account of the customer, a credit balance for redemption at a retailer corresponding to the location of the sale, a product offered by the retailer, and a card with a credit balance.

16. The method of claim 13, further comprising:
verifying the transaction with the retailer prior to providing the rebate.

17. The method of claim 1, further comprising communicating a real-time feed of rebate data.

18. The method of claim 17, wherein the location of the point-of-sale system is a physical retail location, and wherein the computing device from which the rebate request is received is also located at the physical retail location.

19. The system of claim 11, wherein the rebate processor is configured to communicate a real-time feed of rebate data.

20. The system of claim 19, wherein the location of the point-of-sale system is a physical retail location, and wherein the computing device from which the rebate request is received is also located at the physical retail location.

21. The method of claim 13, further comprising communicating a real-time feed of rebate data.

22. The method of claim 21, wherein the location of the point-of-sale system is a physical retail location, and wherein the computing device from which the rebate request is received is also located at the physical retail location.

23. The method of claim 1, Wherein the read data is selected from the group consisting of one or more of a transaction code, a stock keeping unit (SKU) number, a date or time of purchase, a store location, and a rebate amount.

24. A method for processing a rebate submitted at a location of a sale after a purchase of an item subject to the rebate, the method initiated by a computing device operated by a customer and performed over a data network by a programmed processing device, the method comprising:
receiving, by the programmed rebate processing device via the data network from a point-of-sale system at the location, electronic data corresponding to the purchase of the item subject to the rebate, the point-of-sale system configured to process the purchase for the customer;
communicating, from the rebate processing device to the point-of-sale system, data;
subsequently receiving, by the rebate processing device via the data network and from the computing device operated by the customer, a rebate request initiated with data read by the computing device directly from the machine-readable information presented to the computing device by the customer, wherein the read data includes data needed from the point-of-sale system for validating the rebate request, and wherein the machine readable information is generated by the point of-sale system and presented to the customer at the location;
processing, by the rebate processing device, the rebate request using the data read by the computing device directly from the machine-readable information from the customer by automatically comparing the data read from the machine-readable information to the electronic data;
and when the information substantially matches:
transmitting, by the rebate processing device, via the data network for display on the computing device operated by the customer, a plurality of redemption options;
receiving, by the rebate processing device from the computing device, a selection of at least one of the redemption options; and
preparing by the rebate processing device, a selected redemption option for transmission to the customer in accordance with the selection.

25. A system for processing a rebate request initiated by a computing device operated by a customer, comprising:
a point-of-sale system configured to process purchase transactions at a location, the point-of-sale system for processing a purchase of an item by a customer and providing to the customer machine readable information. having data corresponding to the purchase for initiating a rebate corresponding to the purchase, the point-of-sale system further for transmitting electronic data corresponding to the purchase over a communications network;
a computing device configured to:
receive the machine readable information from the customer,
read data directly from the machine readable information, wherein the read data includes data needed from the point-of-sale system for validating the rebate request,
initiate a rebate request after the purchase using the data read by the computing device from the machine readable information, the computing device including at least one of: an input device for receiving the machine readable information, a printer for printing a document for redeeming the rebate, a card dispenser for dispensing a card with a credit balance corresponding to the rebate, a communications interface for initiating an electronic funds transfer to an account of the customer, and a communication interface for transmitting the machine readable information over the communications network;
a processor in communication with the point-of-sale system and the computing device over the communications network, the processor configured to:
receive, via the communications network, the electronic data corresponding to the purchase of the item from the point-of-sale system,
communicate, via the communications network, data to the point-of-sale system,
verify the rebate based on the electronic data received from the point-of-sale system and the data read by the computing device from the machine readable information received from the customer via the computing device, and
process the rebate request using the data read directly from the machine readable information by the computing device.

* * * * *

UNITED STATES PATENT AND TRADEMARK OFFICE
CERTIFICATE OF CORRECTION

PATENT NO. : 8,655,720 B2
APPLICATION NO. : 12/301947
DATED : February 18, 2014
INVENTOR(S) : Woodward et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this
Twenty-ninth Day of September, 2015

Michelle K. Lee
*Director of the United States Patent and Trademark Office*